Jan. 21, 1958 J. J. CHYLE ET AL 2,820,427

WELDING BACK-UP ASSEMBLY

Filed Oct. 1, 1953

INVENTORS:
John J. Chyle and
Michael W. Zimmermann
BY
Andrus & Sceales
ATTORNEYS.

United States Patent Office 2,820,427
Patented Jan. 21, 1958

2,820,427

WELDING BACK-UP ASSEMBLY

John J. Chyle and Michael W. Zimmermann, Milwaukee, Wis., assignors to A. O. Smith Corporation, Milwaukee, Wis., a corporation of New York Application October 1, 1953, Serial No. 383,664

10 Claims. (Cl. 113—111)

This invention relates to a welding back-up assembly for supporting and forming molten weld metal during welding of a joint or seam between the unattached abutting ends of two metal articles and has particular reference to a glass plate back-up and means to hold the plate in back-up position.

An object of the invention is to provide a glass backing strip which supports the molten weld metal and forms a sound and smooth underbead.

Another object is to provide a welding backing strip which may be readily applied in inaccessible locations where the conventional backing strips cannot be used.

Another object of the invention is to provide a weld back-up strip which eliminates the necessity of employing a metallic chill to dissipate the heat of welding.

A further object is to provide a welding back-up device which is convenient to use and low in cost.

In general, the present invention is directed to a welding back-up strip comprising a glass plate or sheet, which is supported by an adhesive tape beneath the seam between the adjacent ends of two metal articles to be welded. The tape is made of a fibrous glass fabric impregnated with a thermo-plastic, pressure sensitive adhesive. By varying the surface contour of the glass plate or the spacing of the plate beneath the seam, a convex, concave, or flat underbead can be obtained which is both sound and smooth.

Figure 1:
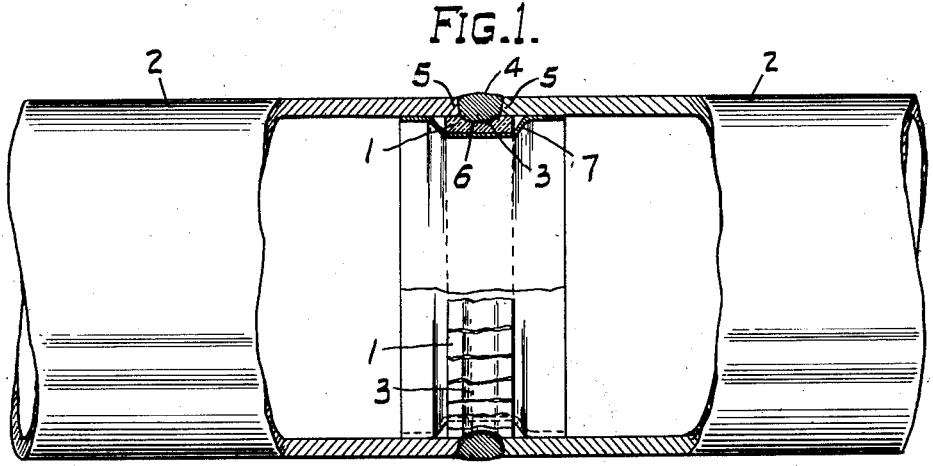
Figure 1 is a fragmentary side elevation of two pipe sections, partly in section, showing the application of one form of the backing strip to the seam to be welded.

Referring to Figure 1, a glass backing strip 1 is shown applied to the underside of the seam between the abutting ends of two tubular members 2 to be welded together. The backing strip serves to support the molten weld metal and to form a sound and smooth underbead.

The backing strip 1 is a relatively thin sheet or plate of glass formed of any of the common types of glass which will not give off gases on heating or fusing and which does not contain elements or ingredients that are apt to react or alloy with the molten weld metal to produce undesirable properties in the weld. Most of the ordinary types of flat glass, bottle glass, window glass or the like are acceptable for use as strip 1. The soda-lime-silica variety of glasses, of which the above-named types are a part, are particularly suitable as strip 1 for they are readily available and economically practical.

The thickness of the glass sheet is preferably in the range of about $\frac{1}{16}$ to $\frac{1}{4}$ inch with a thickness of $\frac{3}{32}$ to $\frac{1}{8}$ of an inch being very satisfactory for most operations. However, the thickness of the sheet 1 may vary depending on the particular type of welding employed and the metals to be welded. If employed with manual welding, the glass sheet should be of such a thickness that momentary hesitation in one position will not burn through the glass and allow the molten metal to flow through.

The glass strip 1 of the embodiment shown in Figure 1, is longitudinally recessed as at 3. During welding the molten weld metal fuses the lips 5 of members 2 and is shaped by the recess 3 to form a convex underbead 6 on the underside of the tubular members 2. The glass will soften or melt upon contact with the molten weld metal and provide the underbead with a very smooth surface.

The depth of the longitudinal recess 3 depends on the degree of convexity desired in the weld bead. A recess having a depth of approximately $\frac{1}{16}$ of an inch has been found for many operations to give a satisfactory convex bead.

When the backing strip 1 is employed with tubular members it may be broken transversely, as shown in Figure 1, at various intervals throughout its length to provide a series of small glass sheets disposed in a generally end-to-end relation. With the glass backing strip 1 broken, it conforms to the general curvature of the tubular members 2.

The glass strip 1 is supported adjacent the underside of tubular members 2 by tape 7. The tape 7 is made from a fibrous glass material, such as gauze or cloth, impregnated with a high temperature, pressure sensitive adhesive. A woven glass fabric impregnated with an adhesive and sold commercially under the name of "Scotch Brand Pressure Sensitive Tape" has proven extremely satisfactory for the tape 7.

In general, the tape 7 should be formed of a backing material, such as glass fabric which will not melt or decompose at the temperatures encountered during the welding operation and the adhesive should retain its adhesive qualities at these temperatures and should not decompose or give off gases which may be injurious to the weld.

The tape 7 is applied by pressure to the underside of the strip 1 and extends laterally outward on either side of the strip. The lateral edge portions of tape 7 are applied or adhered to the respective pipe sections 2.

The tape 7 is preferably continuous in nature and extends the length of the seam to be welded. As the tape is continuous and extends laterally to either side of strip 1, air is restricted from entering the welding area from below and this acts to produce a more sound and uniform weld. The tape 7 need only hold the glass strip 1 in position until the weld has solidified.

The glass backing strip may be employed with the lips 5 of the tubular members 2 whether the lips be formed of a feather edge or of a substantial thickness, as shown. Further, the lips 5 may be either in tight engagement or separated by a substantial gap, as shown. In either case a smooth underbead of the desired convexity is formed.

Figure 2:
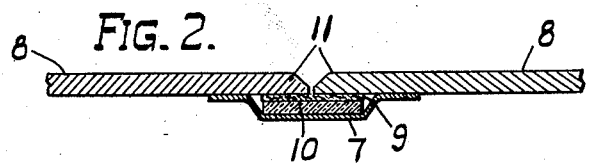
Fig. 2 is a longitudinal sectional view of a modified form of the glass backing strip as applied beneath the seam between opposed edges of two metal plates to be welded together.

Fig. 2 illustrates a modified form of the glass backing strip as applied beneath the seam between adjacent edges of two metal articles, such as plates 8, to be welded.

A layer 9 of an inert fibrous material, such as glass paper, glass fiber or the like, covers the weld supporting surface of glass back-up strip 10. As the material of layer 9 is contacted by the molten weld metal, the material should not react or decompose to give off gases or give up water of hydration as vapor when heated to elevated temperatures during the welding operation. In addition, the material of layer 9 should not contain materials which may alloy with the weld metal to produce undesirable properties in the weld.

The strip 10 is supported beneath the plates 8 by the tape 7 which is identical in construction and function to the tape shown in the first embodiment.

During welding, the molten weld metal melts the material of layer 9 which causes a reduction in volume of the material, thereby permitting the weld metal to sink beneath the lower surface of the plates 8 and form a convex weld bead. The fused or molten glass provides the weld bead with a very smooth surface.

Figure 3:
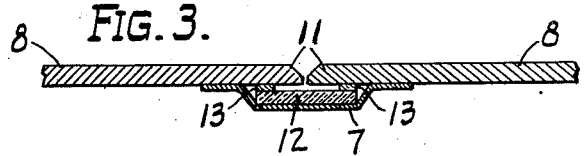
Fig. 3 is a view similar to Fig. 2 showing a second modified form of the backing strip.

In the embodiment illustrated in Fig. 3 there is shown the opposed edges 11 of articles 8 and beneath which is spaced the glass back-up strip 12 by the rods 13 which are laterally spaced on either side of the seam between the opposed edges 11. Rods 13 may be formed of glass, metal or other non-combustible material having a melting point which is sufficiently high so that it will not decompose or discharge gases during the welding operation. The thickness of rods 13 depends on the degree of convexity desired in the weld underbead.

The strip 12 and rods 13 are supported or secured beneath plates 8 by tape 7. During welding the molten weld metal contacts the upper surface of the glass strip 12, softening or melting the same to provide the weld metal with a smooth convex underbead.

Figure 4:
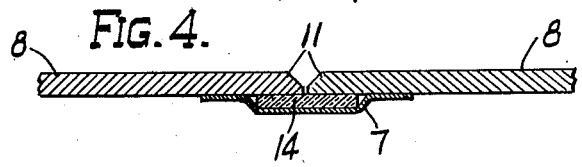
Fig. 4 is a view similar to Fig. 2 showing a third modified form of the backing strip.

A concave underbead, not shown, is obtainable if a glass backing strip is employed as illustrated in Fig. 4. The flat supporting surface of a glass backing plate or sheet 14 rests against the undersurface of the metal members 8 and is aligned with the seam therebetween which is to be welded. As in the previously described embodiments of the invention, the backing plate 14 is supported in position by the tape 7. During welding the molten weld metal fuses the glass plate 14 to provide a smooth underbead which, on solidification of the weld metal, is concave in shape.

Figure 5:
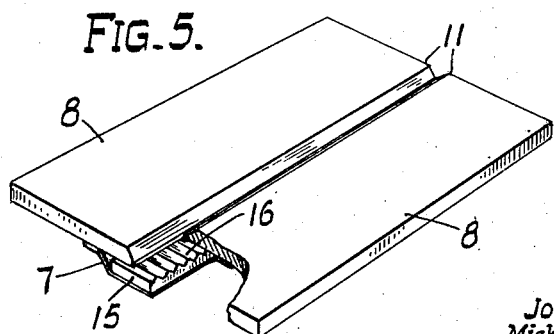
Fig. 5 is a perspective view of a fourth modification of the backing strip as applied to the seam between the adjacent edges of two plates to be welded with a portion of one plate being broken away in section.

Fig. 5 illustrates a glass back-up strip 15 with a transversely serrated surface 16. The glass strip 15 is supported beneath the opposed edges 11 of plates 8 by tape 7 with the serrations 16 disposed transversely to the edges 11.

As the weld metal, not shown, contacts the serrated surface 16, the peaks of the serrations melt or soften and tend to fill the grooves. The result of the above action is a sound, smooth underbead.

The degree of convexity of the underbead obtainable through use of the structure shown in Fig. 5 depends on the depth of the serrations, the amperage per unit time and the area of metal fused adjacent the joint.

The use of a glass sheet in combination with a pressure sensitive adhesive tape provides a backing structure which is inexpensive and can be readily applied to the underside of the seam between the articles to be welded. The attachment to the articles by means of the tape enables the backing strip to be used in extremely small or inaccessible locations where the conventional backing strips cannot be employed.

In addition, the use of the tape 7 aids in restricting air from entering the welding area during welding, and permits the glass backing strip to be readily removed from the welded articles after welding.

The above described invention provides a welding back-up means which is conveniently utilized with automatic or manual welding.

Various modes of carrying out the invention are contemplated as within the scope of the following claims particularly pointing out and distinctly claiming the subject matter which is regarded as the invention.

We claim:

1. A welding back-up assembly adapted to be applied to the underside of a seam between adjacent edges of two metal articles which are to be welded together, which comprises a monolithic glass sheet adapted to be aligned beneath the seam between the adjacent edges of the articles to support the molten weld metal, and heat resistant pressure sensitive adhesive tape applied to the undersurface of the glass sheet and extending laterally from said sheet and adapted to be secured to the articles to hold said glass sheet in position beneath said seam.

2. A welding back-up assembly adapted to be applied to the underside of a seam between the adjacent edges of metal articles to be welded together, which comprises a monolithic glass sheet adapted to be disposed in alignment with the seam between the adjacent edges of the articles, said sheet having a supporting surface to support the molten weld metal during welding of said articles and having a back surface disposed opposite said supporting surface, a heat resistant pressure sensitive adhesive tape applied to the back surface of the glass sheet and extending laterally therefrom and adapted to be secured to the respective articles on either side of the seam therebetween to support the glass sheet, and means disposed on said supporting surface and extending along the side edges of the sheet to provide a space between the underside of the articles and the supporting surface of the glass sheet to permit the formation of a sound and smooth convex underbead.

3. A welding back-up assembly, which comprises a strip of sheet glass adapted to be disposed in alignment with the underside of a seam between the opposed ends of two metal articles to be welded together to support the molten weld metal during welding of said articles, and an adhesive impregnated glass fabric applied to the underside of said glass strip and extending the length of said strip, said glass fabric extending laterally of said strip and adapted to be secured by the adhesive thereon to the metal articles to support said glass strip beneath the seam and restrict the entry of air into the area of welding.

4. A welding back-up assembly adapted to be applied to the underside of the seam between abutting ends of two aligned tubular metal articles to be welded together, which comprises a plurality of independent small glass plates disposed in an end-to-end relation to form a narrow strip of substantially continuous glass when laid on a flat surface, said glass plates adapted to be disposed in alignment with the seam between the abutting ends of the articles and adapted to conform generally to the contour of said articles, and a heat resistant pressure sensitive adhesive tape applied to the back surface of said glass plates, said tape having a greater width than said plates and extending laterally to either side of said plates and adapted to be secured by the adhesive thereon to the tubular articles to support the glass plates in alignment with the seam between the articles.

5. A welding backing assembly adapted to be applied to the underside of a seam between adjacent edges of two metal articles to be welded together, which comprises a narrow monolithic sheet of glass composed of a soda-lime-silica type glass and adapted to support the molten weld metal, said sheet of glass having a supporting surface provided with a longitudinal recess adapted to be disposed in alignment with said seam to form a smooth convex weld bead when the articles are welded together and having a back surface disposed opposite the supporting surface, and a glass gauze impregnated with an adhesive material, said glass gauze being applied to the back surface of said glass sheet and extending laterally therefrom and adapted to be secured to the underside of the metal articles to securely support said glass sheet against said articles.

6. A welding back-up assembly to be attached to the underside of a seam between adjacent edges of two metallic members which are to be welded together, which comprises a strip of monolithic plate glass adapted to be aligned with the underside of the seam between the adjacent edges of the members, said strip of glass having a supporting surface adapted to support the molten weld metal and having a back surface disposed opposite said supporting surface, a layer of fibrous glass material disposed on said supporting surface, and a fibrous glass pressure sensitive adhesive tape applied to the back surface of the glass strip and extending laterally from said glass strip and adapted to be secured by the adhesive thereon to the underside of said metallic members to support said glass strip, said construction forming a smooth convex underbead when the members are welded together.

7. A welding back-up assembly adapted to be applied to the underside of the seam between adjacent edges of two metal articles to be welded together, which comprises a glass plate composed of a soda-lime-silica type glass and adapted to be aligned with the underside of the seam between the two metal articles, said plate having a supporting surface adapted to support a molten weld metal and having a back surface disposed opposite said supporting surface, a pair of non-combustible spacer rods disposed on said supporting surface, said rods being disposed longitudinally of the plate and extending along the side edges thereof, and a heat resistant fibrous glass adhesive tape secured to the under surface of the glass plate and extending laterally therefrom and adapted to be attached by the adhesive thereon to the articles to support said glass plate beneath said seam.

8. A welding back-up assembly to be applied to the underside of a seam between adjacent edges of two metal articles to be welded together, which comprises a monolithic glass strip composed of a soda-lime-silica type glass and adapted to be disposed against the underside of said metallic articles and aligned with the seam between the two articles, said strip having a weld metal supporting surface provided with a series of serrations disposed transversely of the length of said strip and said strip having a back surface disposed opposite said supporting surface, and a heat resistant pressure sensitive adhesive tape applied to the back surface of the glass strip and extending laterally from said glass strip and adapted to be attached by the adhesive thereon to said articles on either side of said seam to support said glass strip in place beneath said seam.

9. A welding back-up assembly to be applied to the underside of a seam between adjacent edges of two metal articles to be welded together, which comprises a monolithic glass strip adapted to be disposed against the underside of said metallic articles and aligned with the seam between the two articles, said strip having a weld metal supporting surface provided with a series of alternate ridges and grooves extending transversely of the length of the strip and said strip having a back surface disposed opposite said supporting surface, and a glass fabric tape impregnated with a heat resistant pressure sensitive adhesive applied to the back surface of said glass strip and extending laterally to either side thereof and adapted to be secured to the metal articles to support the glass strip beneath the seam, said tape extending continuously the length of said glass strip to restrict the entry of air to the welding area during welding.

10. A welding back-up assembly adapted to be applied to the underside of the joint between adjacent edges of two metal articles which are to be welded together, comprising a monolithic glass sheet having a generally flat supporting face adapted to be disposed in contact with the metal articles and aligned with the seam between the adjacent edges of the articles, and a fibrous glass tape impregnated with an adhesive extending laterally across the back of said glass sheet and adapted to be attached to the underside of said metal articles to support said glass sheet tightly against said articles, said construction effecting a smooth concave underbead when the edges of said metal articles are welded together.

References Cited in the file of this patent

UNITED STATES PATENTS

| | | |
|---|---|---|
| 1,980,561 | Wagner | Nov. 13, 1934 |
| 2,206,375 | Swift | July 2, 1940 |
| 2,331,937 | Schreiner | Oct. 19, 1943 |
| 2,362,505 | Smith | Nov. 14, 1944 |
| 2,430,266 | Zimmermann | Nov. 4, 1947 |
| 2,584,072 | White | Jan. 29, 1952 |

OTHER REFERENCES

"Industrial Adhesives," Product Engineering, December 1947, pp. 137–139.

Welding Research Supplement, November 1948, p. 558–S.